United States Patent [19]

Hiss et al.

[11] Patent Number: 5,310,159
[45] Date of Patent: May 10, 1994

[54] DESTRUCTIBLE CORE FOR UNDERCUT CASTING

[75] Inventors: André Hiss, Le Haillan; Jean-Michel Tauzia, Blanquefort, both of France

[73] Assignee: Societe Nationale des Poudres et Explosifs, Paris, France

[21] Appl. No.: 736,082

[22] Filed: Jul. 26, 1991

[30] Foreign Application Priority Data

Aug. 2, 1990 [FR] France .................. 90 09883

[51] Int. Cl.⁵ .................................. C06B 21/00
[52] U.S. Cl. .......................... 249/61; 249/175; 425/DIG. 15; 425/DIG. 43; 264/3.1
[58] Field of Search ........... 249/61, 175, 178, 183; 264/3.1, 221; 425/DIG. 15, DIG. 43

[56] References Cited

U.S. PATENT DOCUMENTS

| | | | |
|---|---|---|---|
| 454,939 | 6/1891 | Chenoweth | 249/178 |
| 2,045,556 | 6/1936 | Almen | 249/62 |
| 2,343,292 | 3/1944 | Greneker | 249/61 |
| 2,364,710 | 12/1944 | Greneker | 249/61 |
| 3,120,028 | 2/1964 | Streeter et al. | 249/183 |
| 3,136,002 | 6/1964 | Schwartz | 425/DIG. 43 |
| 3,345,438 | 10/1967 | Carey | 249/183 |
| 3,524,618 | 8/1970 | Collman et al. | 264/221 |
| 3,952,627 | 4/1976 | Gardiner et al. | 264/3.1 |

FOREIGN PATENT DOCUMENTS

| | | |
|---|---|---|
| 3724665 | 9/1988 | Fed. Rep. of Germany . |
| 1423712 | 9/1988 | U.S.S.R. ................ 249/183 |
| 574211 | 12/1945 | United Kingdom . |
| 2019756 | 11/1979 | United Kingdom . |

OTHER PUBLICATIONS

Patent Abstracts of Japan, vol. 4, No. 143, Oct. 3, 1980 (Abstract of 55-97844).

*Primary Examiner*—Jay H. Woo
*Assistant Examiner*—Robert B. Davis
*Attorney, Agent, or Firm*—Bucknam and Archer

[57] ABSTRACT

Destructible cores useful particularly for shaping the internal channels of cast propellant blocks. The cores include at least one elongated element which is shaped, for example by winding, the cohesion of which is ensured by way of a joining material and a portion of which is accessible from the exterior of the component to be cast. In order to obtain quickly cores having a high rigidity, the shaped element is a band which includes interlaced wires having free spaces, the joining material filling the free spaces.

8 Claims, 2 Drawing Sheets

DESTRUCTIBLE CORE FOR UNDERCUT CASTING

FIELD OF THE INVENTION

This invention relates to destructible cores which permit the casting of components, for instance propellant blocks, having at least one internal cavity which is open to the outside only by way of one or more restricted orifices opposing the extraction of a core by simple displacement. More particularly, the present invention relates to cores for casting components comprising a polymerisable material, and in particular cores which can be used for shaping the internal channels of cast propellant blocks.

DESCRIPTION OF THE RELATED ART

Destructible cores are known which comprise at least one very long element which is shaped in order to be contained within the outer surface of the core. The cohesion of the core is ensured by means of a joining material and a portion of the core is accessible from outside the component. It is known, for example, to make unwindable cores from high-strength wires covered with a joining material such as a thermoplastic resin. The core is manufactured on winding machines which permit the final shaping of the core which is subsequently subjected to a heat treatment, in such a way that the joining material which coats the wires rigidly connects the various portions of wires in contact. This rigid connection has a mechanical strength which is, on one hand, sufficient to ensure the rigidity of the core and, on the other hand, is sufficiently weak with respect to the breaking strength of the wire, in such a way that, after casting a component about the core, it is possible to break this rigid connection between the wires by pulling on the wire, in order to unwind this core and extract it from the cast component.

The method of filament winding described hereinabove is poorly suitable for making cores since it takes a very long time to implement, the unwinding operation taking particularly a long time when the cores have a substantial volume, which is often the case for manufacturing propellant blocks. In order to overcome this disadvantage, it has been proposed to form the cores from preimpregnated bands formed from high-strength wires covered with a joining material, but the tests carried out have shown that this method has greatly limited the possibility of forming the core, and that the outer surface of the core was too irregular. Further, all these winding techniques are suitable only for cores of simple external shapes, such as shapes of revolution, and in no way enable cores to be made the outer surface of which has concavities such as indentations arranged substantially along the generatrices of these shapes of revolution.

The making of cores having a high contraction ratio, that is the ratio between the largest diameter of the circle circumscribed by the core and the diameter of the orifice permitting the extraction of this core, is often necessary for manufacturing propellant blocks. For example, U.S. Pat. No. 3,952,627 relates to the manufacture of such a core using braiding methods which are similar to winding since the core consists of an elastomer which coats an internal reinforcement comprising radial stiffening bars and a cable braided over these bars. It should be noted that, although such a core manufacturing method is very suitable for making cores of a small thickness, it is, however, poorly suitable for making thick cores; moreover, this method does not allow cores to be obtained having a contraction ratio greater than three, which considerably limits the possibilities of use of this method.

SUMMARY OF THE INVENTION

The object of the present invention is to overcome the disadvantages resulting from the methods of filament winding and braiding on a rigid reinforcement. The core consists of a very long element which is a band consisting of interlaced wires having free spaces and of a joining material which fills the free spaces.

The very long element is shaped so as to be contained within the outer surface of the core. Cohesion is obtained by means of a joining material. A portion of the very long element is accessible from outside the component.

The width of the band coated by the joining material is less than the initial width of this band because it is possible for this reduction in width to result, in particular, from a shaping operation.

The free spaces formed between the interlaced wires are the meshes of a knitted band, the band having a thickness considerably greater than simple woven bands, and its thickness is substantially equal to three times the diameter of the wire used. In order to increase further the "bulk" of the band, in other words the ratio between the outer volume of the knitted band and the volume of the wire used for the production of this band, it is desirable to use tubular knitted bands. More particularly, the core consists of a very long element arranged in layers; these layers are either in direct contact or are separated by intermediate elements. These intermediate elements are preformed and are either spherical or cylindrical depending upon the method used for shaping the band, either bending or winding. They are so dimensioned that they may be extracted with the band, through the bore formed by the mandrel of the core.

These intermediate elements are preferably made from very low-density rigid expanded foam. The joining element fills virtually all the free spaces between the layers of the very long band and any intermediate elements, as well as those spaces existing between the interlaced wires of the band. This joining element is made conductive, using methods known to one skilled in the art, in order to overcome problems of static electricity; it is also selected so as to be chemically compatible with the material of the object to be cast.

In order to permit a good cohesion of the various band layers when they are in direct contact, the initial width of the band is advantageously between the width of the core and three times this width. Similarly, when the band is shaped with intermediate elements, the width of the band does not exceed the maximum thickness of the finished core by more than 10%.

The band preferably comprises at least thirty per cent by volume of metal wires in order to provide sufficient rigidification of the joining material. It is possible for all the wires to be metal since the tests carried out with knitted steel-wire bands have given good results, both in terms of the rigidity and dimensional stability of the core and in terms of the density of the core which can be brought to a density close to that of light alloys, or even lower when the very long element is shaped with the aid of intermediate elements.

When the core is made with a very long band shaped in layers in direr-t contact, this very long band represents at least 90% by volume of the core. When the core is made with a very long band shaped in layers separated by intermediate elements, this very long band represents no more than 10% by volume of the core.

In order to facilitate the complete destruction of the core by pulling the very long band, it is advantageous for the wires to be flush with the outer surface of the core. This requires that the band be shaped in such a way that it is exactly contained within the outer surface of the core. It is also possible that this shaping results only in a blank of more limited dimensions, the final dimensions of the core being determined solely by the joining material which therefore forms a skin permitting an excellent surface finish and high dimensional accuracy.

When the very long element is arranged in interlaced layers in direct contact, the joining material is preferably a rubber body, and more particularly a flexible thermosetting polymer such as a silicone resin which fills all the free spaces of the band. This joining material may be made conductive to overcome static electricity.

When the very long element is shaped with the aid of intermediate elements, the joining material is a very low-density rigid expanded foam such as a polyurethane foam. This joining material may be made conductive to overcome static electricity.

According to one embodiment of the core which is suitable for casting fragile components, the band is shaped on a tubular mandrel into which a portion of this band penetrates the mandrel. This guides the band as it unwinds in order to prevent any friction on the cast component. This band portion, which is accessible from outside the component, is advantageously situated at one of the ends of the band which is twisted in order to form a cord.

The present invention also relates to the process for manufacturing destructible cores, permitting the casting of components having at least one internal cavity which is open to the outside only by way of one or more restricted orifices. The process is useful particularly for the manufacture of cores for shaping the internal channel of cast propellant blocks, and comprises an operation of shaping at least one very long element which is contained within the outer surface of the core, a portion of which is accessible from outside the component, and an operation of rigidly connecting the various portions of this very long element by means of a joining material. The shaping operation is carried out using a band which consists of interlaced wires having free spaces. The operation of rigidly connecting the various portions is carried out by molding or injection-molding of a joining material which fills virtually all these free spaces.

The first shaping process comprises, initially, a step of arranging the very long band in successive layers in direct contact, this arrangment being effected in a volume greater than the final volume of the core. Then a so-called compacting step is carried out which results in the band being contained within the outer surface of the core. The joining material is then molded.

Advantageously, the compacting stage and the operation of molding the joining material are carried out in the same die, which results in the wires of the band being flush with the outer surface of the core and the shaping operation results in obtaining a blank, the apparent density of which lies between 1.7 and 4.3.

A second shaping process comprises a stage of arranging the band in layers separated by intermediate elements. This arrangement is effected in a volume contained within the outer surface of the core using a shaping mold. The expanded foam is then injected into an appropriate mold. The final blank has an apparent density less than 1 and, in particular, lying between 0.05 and 0.5.

When the core is a body of revolution or has a shape close to a volume of revolution, it is advantageous for the shaping operation to employ the winding method, but it is necessary to employ entirely or partly the method of successive bending operations when the core has a more complex shape, in particular angular shapes.

According to a particular manufacturing process, the shaping operation begins by introducing a portion of the band into a tubular mandrel which constitutes the support of the core and corresponds to the orifice of the component to be cast, and this portion, which is accessible from outside the component, is advantageously situated at one of the ends of the band which is twisted in order to form a cord. In the case of the manufacture of cores of complex shape, this tubular mandrel can contain a plurality of cords, each of which corresponds to a band which has been shaped in order to form only part of the reinforcement of the core. Since it is possible for a single joining material to connect rigidly all these bands which can be pulled simultaneously or successively in order to effect the complete destruction of this core of complex shape.

BRIEF DESCRIPTION OF THE DRAWINGS

The description of the following specific embodiments explains the invention in more detail and highlights its advantages, by reference to the drawings of which.

Figure 1:
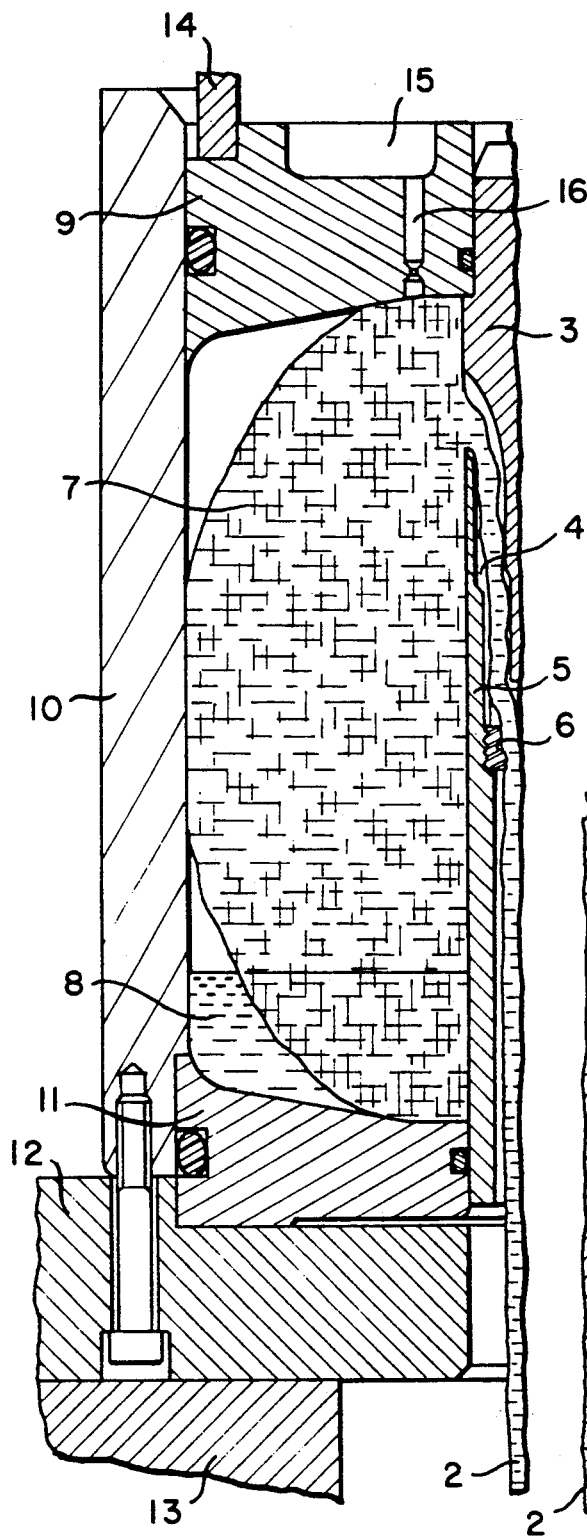
FIG. 1 illustrates the initial position, shown in a left-hand half-view in frontal cross-section, of a die permitting the completion of the shaping of the band consisting of interlaced wires and the molding of the joining material.
Figure 2:
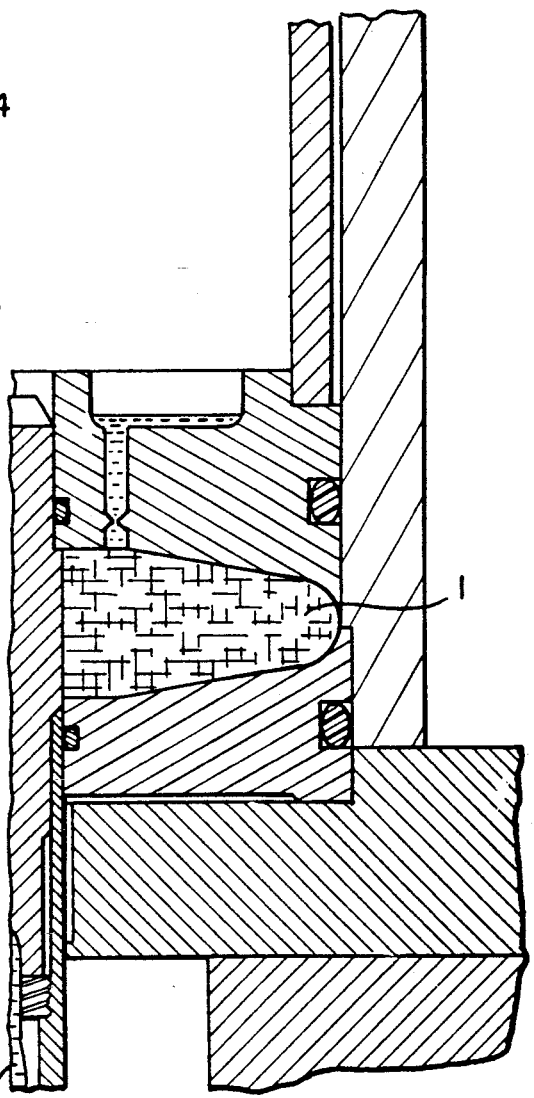
FIG. 2 illustrates the final position of the die, shown in a right-hand half-view in frontal cross-section.

According to a first embodiment (FIGS. 1 and 2), the destructible core 1 is obtained from a tubular knitted band which has an initial width of 60 millimeters and which corresponds to a double-mesh knit of stainless steel wire of 0.20 millimeter diameter. This band is commercially available in the form of reels which contain up to 10 kilograms of continuous band, which represents a length close to 265 meters per reel. The manufacture of the core 1, the external diameter of which is 130 millimeters and the thickness of which is 31 millimeters, requires the use of 21.5 meters of this band, the end 2 of which is twisted over a length of 0.5 meter in order to form a cord, with a diameter of approximately 5 to 6 millimeters. This band is engaged into a tubular mandrel. This mandrel consists of an end piece 3 which comprises a slot 4 in which is placed the end of the band and which is screwed into the tube 5 equipped with a seal 6. The cord of the band is temporarily made fast to the mandrel which is placed between the jaws of a lathe, and the metal knitted band is wound helically by hand onto this mandrel in order to form an ovoid blank 7. The length of the blank is of the order of 160 millimeters and the maximum diameter is in the order of 130 millimeters. This winding can be carried out by hand since a low tensioning of the band is sufficient. After this first stage of arranging the band, the shaping operation is continued by placing the tubular mandrel in the die which is shown in FIGS. 1 and 2. The die permits the carrying out of the compacting stage and the operation of molding a joining material consisting, in the example, of a silicone resin 8 which polymerises at ambient temperature.

With the upper shell 9 of the mold withdrawn, the ovoid blank 7 made fast to the mandrel is introduced into the compacting cylinder 10, and the tube 5 of the mandrel is engaged in the central bore of the lower shell 11 of the mold. The cylinder 10 is fixed by bolts to the base 12 of the die which rests on the plate 13 of a press which can generate a pressure of 70 tons. Silicone resin 8, in the amount of 200 grams, is then poured into the mold, the upper shell 9 is replaced, and tubular spacer 14 is placed in between the ram of the press and the upper part of the shell which is also provided with an annular recess 15 into which open the four vents 16. The stage of compacting the ovoid blank takes place by lowering the upper shell 9 into the lower position shown in FIG. 2, and the excess silicone resin rises through the vents. The apparent density of the blank which results from the compacting is then 2.8 and results in a core 1 whose actual density is 3.5. After polymerisation of the silicone resin, the compacting cylinder 10 is disconnected from the base 12, the two shells 9 and 11 are extracted from the cylinder, and the core 1 made fast to the mandrel is then burred, subjected to an anti-adhesive treatment and is then ready to be placed in a casting mold. The mandrel permits the positioning of the core in the mold, the end of the tube 2 being situated outside the mold.

After the casting of the component to be manufactured, for example a propellant block with a central channel comprising an internal recess corresponding to the inserted core, the core can easily be removed without spoiling the inner surface of the propellant block simply by pulling on the end 2 of the band rolled into a cord.

According to the above-described embodiment, and using a flexible silicone resin embrittled by the addition of a silicone oil, the initiation of the destruction of the core by unwinding is effected by a tensile force of approximately 5 decanewton, and the maximum tensile force to be exerted does not exceed 20 decanewton at the end of the unwinding. These results show that the use of a metal knitted band permits good interlacing of the various meshes and gives the compacted blank good mechanical rigidity, and at the same time is sufficiently limited not to cause portions of bands in mutual contact to become fastened together, and permits very rapid unwinding with a small tension, even when the band has been subjected to a compacting stage which considerably deforms the initially wound turns.

According to the above-described example of manufacture, the compacting stage and the molding operation take place in the same die, but the compacting operation can be carried out in a separate die similar to that shown in FIGS. 1 and 2, the only difference being that the mold cavities of the two shells 9 and 10 are smaller in order to obtain a compacted blank the external dimensions of which are 1 millimeter less than the dimensions of the finished core. Thus it is possible for the blank to be placed into an injection-molding mold in which the two shells are machined to the dimensions of the finished core. Specifically the tube 5 of the mandrel advantageously is placed in the upper position so that the slot 4 of the end piece 3 and the duct of the tube are used as a vent. In this manner, there is no need for a seal between the twisted end 2 of the band and the tube 5. The use of separate dies for the compacting and for the molding of the core permits the use of light molds which are not resistant to pressure. This method can be used, in particular, for making cores of complex shapes which can result from the juxtaposition of a plurality of blanks made from a compacted knitted band initially wound or bent into an accordion shape, all these blanks being rigidly connected together by a single joining material which penetrates between the deformed meshes of the blanks. In this case the tube of the central mandrel then has a diameter sufficient to permit the passage of the cords of each of the blanks.

According to a second embodiment of the invention, the destructible core is obtained from a knitted band with a width of approximately 44 millimeters. The manufacture of this core, the diameter of which is 435 millimeters and the maximum thickness 40 millimeters, necessitates the use of approximately 8 meters of this knitted band. The external diameter of the mandrel on which the band is wound is 160 millimeters. The intermediate elements are spheres of expanded foam 20 millimeters in diameter; moreover, they are manufactured using known methods and means which do not form part of the present invention.

The mandrel consists of two parts 23 a and 23 b, centered relative to each other and assembled by the bolt 27. The mandrel 23 a, 23 b is temporarily connected, its axis being vertical, to a rotating plate. A circular flat mold is temporarily fixed on the mandrel; it serves as a support during the operation of winding the knitted band. In the same manner as in the first example, the end 22 of the knitted band 20 is twisted and then engaged in the tubular mandrel 23 a, 23 b, to which it is temporarily made fast. The knitted band 20 is wound onto the mandrel, a first layer in direct contact with the mandrel; then, for the following turns, the intermediate elements 21 are introduced manually between the successive layers of the band. The tension of the band during the winding is sufficient to retain these intermediate elements. The portion of knitted band which is to be wound can also be subjected to a prior preparation. This portion receives, by coating or by spraying, a layer of glue (polyurethane glue) onto which the intermediate elements are stuck in order to facilitate handling operations during the winding. This winding is completed by a last layer of knitted band which will be in direct contact with the previous layer in order to close the winding by interlacing the meshes or by binding wires between the meshes.

Figure 3:
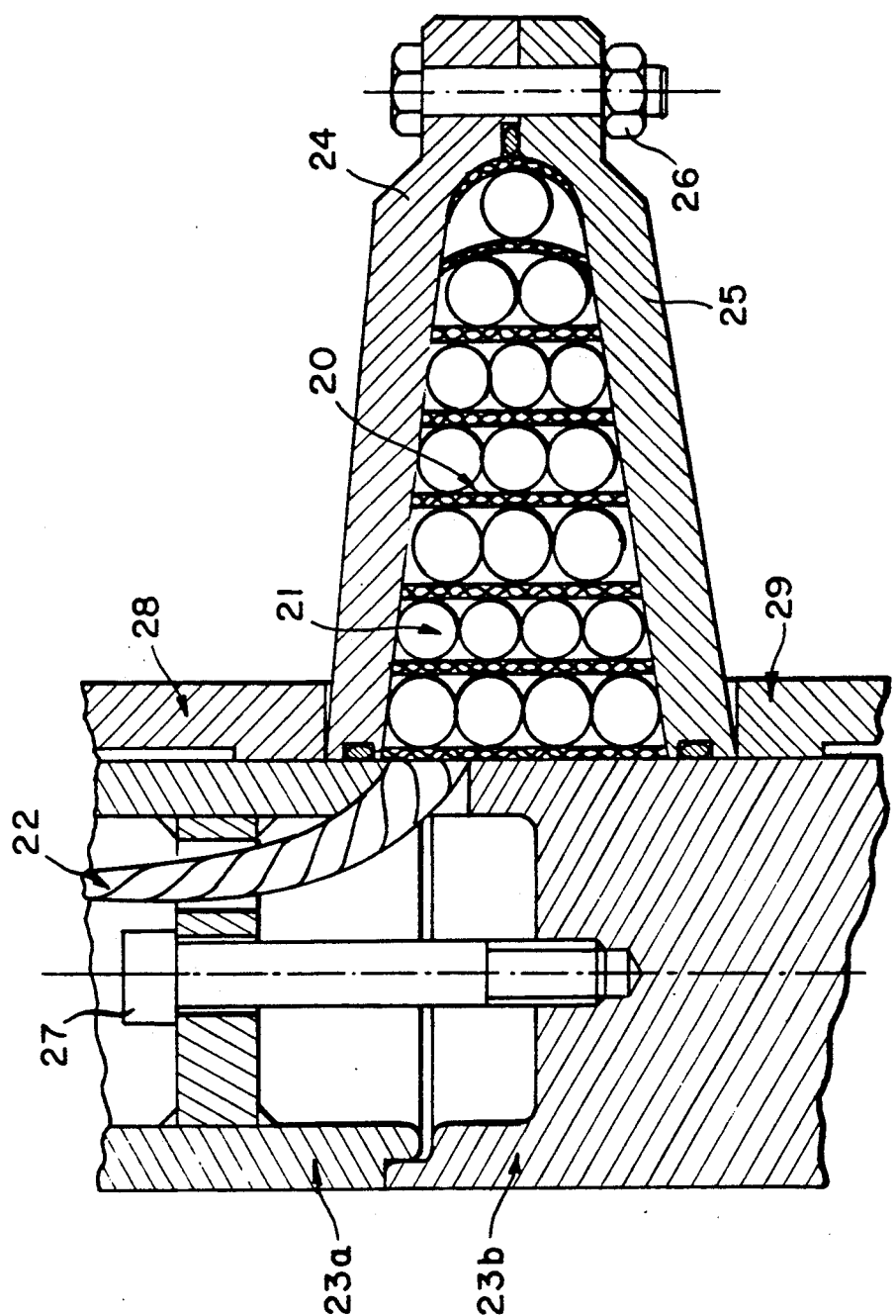
FIG. 3, shown in a right-hand half-view in frontal cross-section, illustrates, in the shaping mold, a core with a geometry of revolution made by winding a very long band with intermediate elements.

This winding is carried out in such a way that the volume is very close to the final volume, by changing the number of intermediate elements, their spacing and the possibility of bending back the free edges of the knitted band against the sides of the core. The reinforcement thus made, by winding of the knitted band about the mandrel in layers separated by intermediate elements, is disconnected from the rotating plate, and the circular flat mold is disassembled. The reinforcement is placed and centered via the mandrel in a mold for shaping to the dimensions of the core to be manufactured as shown in FIG. 3. As in the first example, this mold is made in two half-shells 24, 25 and it is closed, for example, with the aid of bolts 26. The closing of the mold completes the shaping of the reinforcement, in particular by bending back the free edges of the knitted band against the sides of the mold. The knitted band is then made flush with the sides of the mold, as in the previous example. The spacers 28 and 29 fixed by appropriate means to the two elements 23 a and 23 b of the mandrel immobilize the mold. The half-shells of the mold are provided with a plurality of orifices for injecting the joining material so that this material impregnates the entire reinforcement and takes up the entire free volume. The injection orifices and the injection system are not shown in FIG. 3 but may be similar to the arrangements provided in the first example.

The joining material is a mixture of a polyurethane resin with pore-forming agents, surfactants, electrically conductive fillers, for instance conductive carbon black and an isocyanate, optionally with a crosslinking Catalyst. After reaction and setting, under moderate heating, at approximately 30° C., a low-density expanded foam is obtained which coats the entire reinforcement. The injection-molding mold is opened, and the core obtained is withdrawn for the finishing operations: burring and then the application of an anti-adhesive layer, for instance conductive silicone. As in the first example, this core can serve for the manufacture by casting of a propellant block with a central channel comprising an internal recess corresponding to the inserted core. The extraction of the core takes place without spoiling the internal surface of the propellant block, by pulling the end 22 of the band rolled into a cord; however, in this example, the extraction of a knitted band must take place using mechanical or electromechanical means, for instance unwinding machine, which enable the tensile force to be controlled as a function of the strength of the knitted band.

We claim:

1. A destructible core used for casting of a propellant block, said propellant block having at least one internal cavity and having an outer surface and being open to the outside only by way of one or more restricted orifices, said core having an outer surface and comprising at least one elongated element which is shaped in order to be contained in said outer surface of the core, a portion of said elongated element being a band of knitted wires having free spaces, said knitted wires forming layers, intermediate elements separate said layers, wherein said free spaces of said knitted wires are filled with a joining material, said joining material providing cohesion between said layers of knitted wires, said core being removed after the propellant block is cast by traction applied to said portion of said elongated element which is accessible from the outside, said intermediate elements being cylindrical or spherical.

2. The core according to claim 1, wherein said intermediate elements are made from low-density rigid expanded foam.

3. The core according to claim 1 wherein said band comprises at least thirty percent by volume of metal wires.

4. The core according to claim 3 wherein all the wires of said band are made of metal.

5. The core according to claim 1 wherein said wires are flush with said outer surface of the said core.

6. The core according to claim 1 wherein said joining material is a rubber body.

7. The core according to claim 1 wherein said joining material is a rigid expanded foam.

8. The core according to claim 1 wherein said band constitutes no more than 10% by volume of the finished core.

* * * * *